United States Patent
Owhadi

(10) Patent No.: US 10,560,469 B2
(45) Date of Patent: Feb. 11, 2020

(54) IDENTIFYING DEVIATIONS IN DATA

(71) Applicant: Hewlett Packard Enterprise Development LP, Houston, TX (US)

(72) Inventor: Eric Owhadi, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 769 days.

(21) Appl. No.: 15/112,758

(22) PCT Filed: Jan. 24, 2014

(86) PCT No.: PCT/US2014/013001
§ 371 (c)(1),
(2) Date: Jul. 20, 2016

(87) PCT Pub. No.: WO2015/112162
PCT Pub. Date: Jul. 30, 2015

(65) Prior Publication Data
US 2016/0352767 A1    Dec. 1, 2016

(51) Int. Cl.
| | |
|---|---|
| H04L 29/06 | (2006.01) |
| G06K 9/62 | (2006.01) |
| G06F 17/16 | (2006.01) |
| G06F 17/18 | (2006.01) |

(52) U.S. Cl.
CPC ...... *H04L 63/1425* (2013.01); *H04L 63/1416* (2013.01); *G06F 17/16* (2013.01); *G06F 17/18* (2013.01); *G06K 9/6284* (2013.01)

(58) Field of Classification Search
CPC . H04L 63/1425; H04L 29/06; H04L 63/1416; G06F 17/16; G06F 17/18; G06K 9/6284; G06K 9/62
See application file for complete search history.

(56) References Cited

U.S. PATENT DOCUMENTS

| | | | |
|---|---|---|---|
| 5,465,321 A | 11/1995 | Smyth | |
| 6,952,662 B2 | 10/2005 | Wegerich et al. | |
| 9,843,596 B1 * | 12/2017 | Averbuch | H04L 63/1416 |
| 9,961,096 B1 * | 5/2018 | Pierce | H04L 63/1425 |
| 2003/0236990 A1 * | 12/2003 | Hrastar | H04L 41/0893 726/11 |
| 2008/0086493 A1 * | 4/2008 | Zhu | G06F 16/2462 |
| 2010/0071061 A1 | 3/2010 | Crovella et al. | |
| 2011/0307220 A1 | 12/2011 | Lacaille | |

(Continued)

OTHER PUBLICATIONS

Ahmad, M. et al., Query Interactions in Database Systems, (Research Paper), Jan. 8, 2013, 139 Pages.

(Continued)

*Primary Examiner* — Jayesh M Jhaveri
(74) *Attorney, Agent, or Firm* — Hewlett Packard Enterprise Patent Department

(57) ABSTRACT

In an example, metrics that cause a deviation in data may be identified by collecting the data for selected metrics stored in a plurality of tables. A metric vector is constructed based on the data for the selected metrics. A probability density may be calculated for the metric vector that indicates a deviation value for the metric vector relative to other metric vectors. Moreover, an outlier metric from the metric vector that causes the deviation value for the metric vector may be identified.

12 Claims, 4 Drawing Sheets

(56) References Cited

U.S. PATENT DOCUMENTS

| | | | |
|---|---|---|---|
| 2012/0131674 A1* | 5/2012 | Wittenschlaeger | G06F 21/552 726/23 |
| 2012/0191843 A1 | 7/2012 | Ding et al. | |
| 2013/0110761 A1* | 5/2013 | Viswanathan | G06N 20/00 706/52 |
| 2015/0227681 A1* | 8/2015 | Courchesne | C12Q 1/6883 506/9 |
| 2018/0034836 A1* | 2/2018 | Chen | H04L 41/142 |

OTHER PUBLICATIONS

Albano, J.A. et al., Euclidean Commute Time Distance Embedding and Its Application to Spectral Anomaly Detection, (Research Paper), Jun. 25, 2012, 15 pages.

Ding, Q. et al., A Compressed PCA Subspace Method for Anomaly Detection in High-dimensional Data, (Research Paper), Apr. 11, 2012, 30 Pages.

International Search Report & Written Opinion received in PCT Application No. PCT/US2014/013001, dated Apr. 29, 2015, 8 pages.

Sotiris, V. A. et al., "Anomaly Detection Through a Bayesian Support Vector Machine," Reliability, IEEE Transactions on 59.2, Jun. 2010, pp. 277-286.

* cited by examiner

IDENTIFYING DEVIATIONS IN DATA

BACKGROUND

Anomaly detection in multivariate time series is a data mining task with applications to information technology (IT) ecosystem modeling, network traffic monitoring, medical diagnosis: and other domains. Anomaly detection is the identification of items, events or observations that do not conform to an expected pattern in a dataset. Anomalies are also referred to as outliers, novelties, noise, deviations and exceptions. Typically, the anomalous items translate to a particular problem or incident within an application. For example, a detected anomaly may identify an incident with a particular server or component in an IT ecosystem, which may result in operational issues that impact production.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
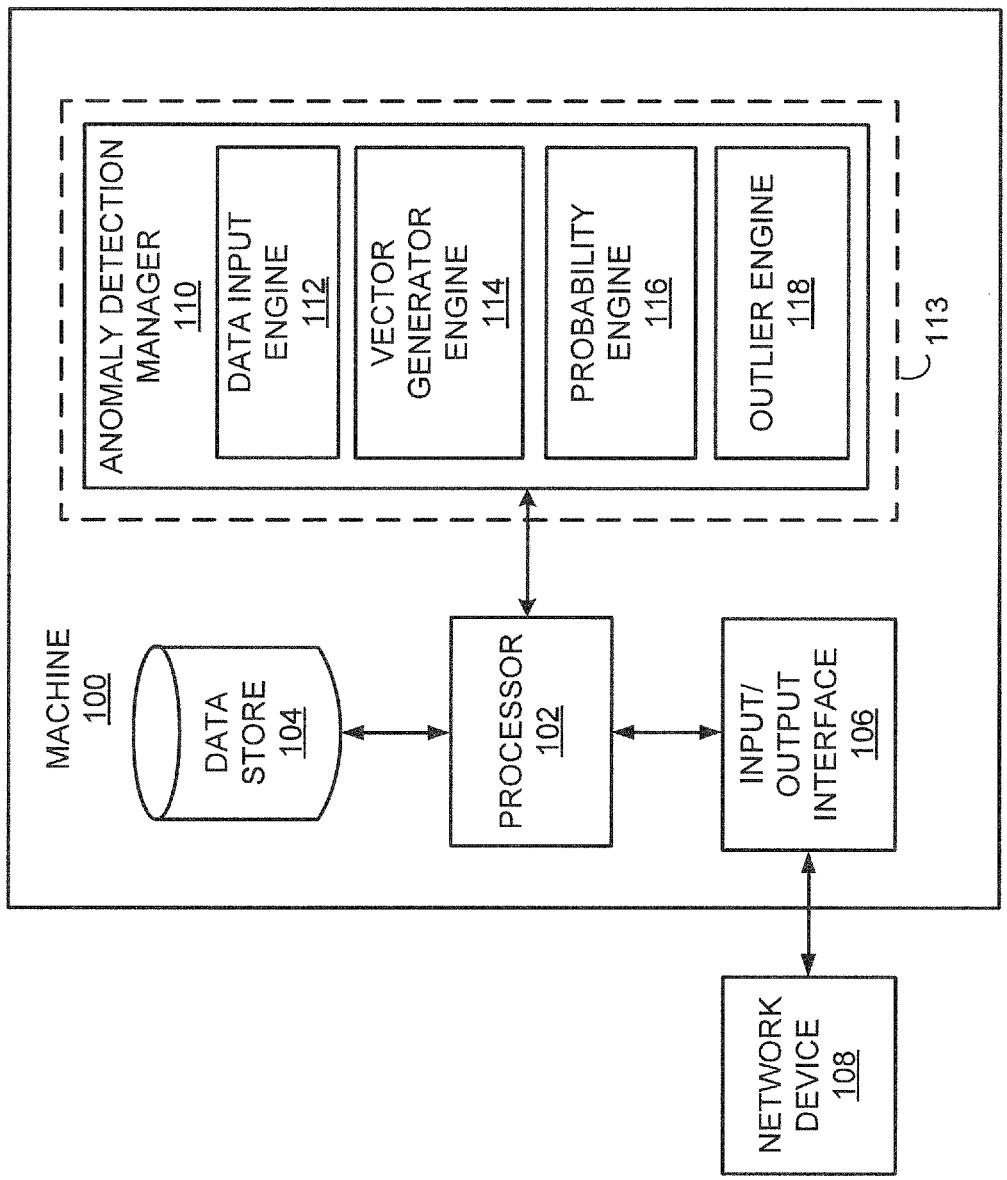
FIG. 1 shows a block diagram of a machine to identify metrics that cause a deviation in data, according to an example of the present disclosure.

For simplicity and illustrative purposes, the present disclosure is described by referring mainly to an example thereof. In the following description, numerous specific details are sot forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Disclosed herein are examples of a method to identify metrics that cause a deviation in data, such as time series data. Also disclosed herein is a system for implementing the methods and a non-transitory computer readable medium on which is stored machine readable instructions that implement the methods. Methods to identify metrics that cause a deviation in data may be implemented or invoked in operation control IT ecosystems where metrics are collected as time series, representing various information collected from servers, network component or storage components.

According to a disclosed example, metrics that cause a deviation in data may be identified by collecting the data for selected metrics stored in a plurality of tables. A metric vector may be constructed based on the data for the selected metrics. According to an example, the metric vector may be constructed by implementing a simple query syntax that normalizes the data for the selected metrics within designated time boundaries and creates a pivot for each node for the selected metrics. A probability density for the metric vector may then be calculated to indicate a deviation value for the metric vector relative to other metric vectors. According to an example, an alert may be triggered in response to the calculated probability density value reaching a predetermined threshold.

Additionally, an outlier metric may be identified from the metric vector that causes the deviation value for the metric vector. According to an example, the outlier metric may be further identified as the sole cause of the deviation value or may be identified as directly or inversely correlating with another metric to cause the deviation value. A report may be generated that includes a column for the calculated probability density and a column for the identified outlier metric to assist an end-user in investigate system anomalies and determine the root cause of the anomaly.

In other data platform applications, database administrators (DBAs) may build their own library of tools to assist in their daily tasks. But while graphs and tables are useful, they do not readily identity anomalies that can result in operational issues that impact production workloads. The quantity of data makes forensic tasks difficult. These anomalies take time to identify and the forensic task must generally be implemented by skilled data analysts who first investigate a problem statement, and then define what data to measure and what algorithm to use for the desired outcome. Accordingly; deep domain knowledge is needed to understand the problem statement, the semantics, and the data availability for each specific situation. Often, the expertise required to use machine learning techniques is an insurmountable obstacle for DBAs.

Accordingly, the disclosed examples provide an intuitive and time-effective method for DBAs to access machine learning techniques without needing an extensive math background while using familiar interfaces. The disclosed examples may implement a simple query syntax to build machine learning metric vectors out of collected times series data for selected metrics. Additionally, the disclosed examples may create two new columns to existing data for a calculated probability density value and an outlier metric. This, combined with a Multivariate Gaussian Distribution algorithm, makes generic anomaly detection accessible to non-data analyst experts in an inexpensive and generic way.

With reference to FIG. 1, there is shown g block diagram of a machine 100 to identify metrics that cause a deviation in data according to an example of the present disclosure. It should be understood that the machine 100 may include additional components and that one or more of the components described herein may be removed and/or modified without departing from a scope of the machine 100.

The machine 100 is depicted as including a processor 102, a data store 104, an input/output interface 100, and an anomaly defection manager 110. The machine 100 may be a computer. In one example, the computer is a server but other types of computers may be used. Also, the components of the machine 100 are shown on a single computer as an example and in other examples the components may exist on multiple computers. The machine 100 may store a table in the data store 104 and/or may manage the storage of data in a table stored in a separate machine, for instance, through a network device 108, which may comprise, for instance, a router, a switch, a hubs etc. The data store 104 includes a storage device, such as hard disk, memory, etc.

The anomaly detection manager 110 is depicted as including a data input engine 112, a vector generator engine 114, a probability engine 116, and an outlier engine 118. The processor 102, which may comprise a microprocessor, a micro-controller, an application specific integrated circuit (ASIC), or the like, is to perform various processing functions in the machine 100. The processing functions may include the functions of the engines 112-118 of the anomaly detection manager 110 as discussed in greater detail herein below.

In one example, the anomaly detection manager 110 includes machine readable instructions stored on a non-transitory computer readable medium 113 and executed by the processor 102. Examples of the non-transitory computer readable medium include dynamic random access memory (DRAM), electrically erasable programmable read-only memory (EEPROM), magnetoresistive random: access memory (MRAM), Memristor, flash memory, hard drive, and the like. The computer readable medium 113 may be included in the data store 104 or may be a separate storage device. In another example, the anomaly detection manager 110 includes a hardware device, such as a circuit or multiple circuits arranged on a board. In this example, the engines 112-118 comprise circuit components or individual circuits, such as an embedded system or ASIC.

The input/output interface 106 includes a hardware and/or a software interface. The input/output interface 106 may be a network interface connected to a network, such as the Internet an intranet, etc., through the network device 108, over which the anomaly detection manager 110 may receive and communicate information, for instance, information regarding a query. The processor 102 may store information received through the input/output interface 106 in the data store 104 and may use the information in implementing the engines 112-118. The data store 104 may include volatile and/or non-volatile data storage.

The engines 112-118 of the anomaly detection manager 110 perform an identification of metrics that cause a deviation in data as described herein. The functions of the data input engine 112, the vector generator engine 114, the probability engine 116, and the outlier engine 110 are discussed in greater detail with respect to methods 200, 300, and 400 in FIGS. 2, 3, and 4.

Figure 2:
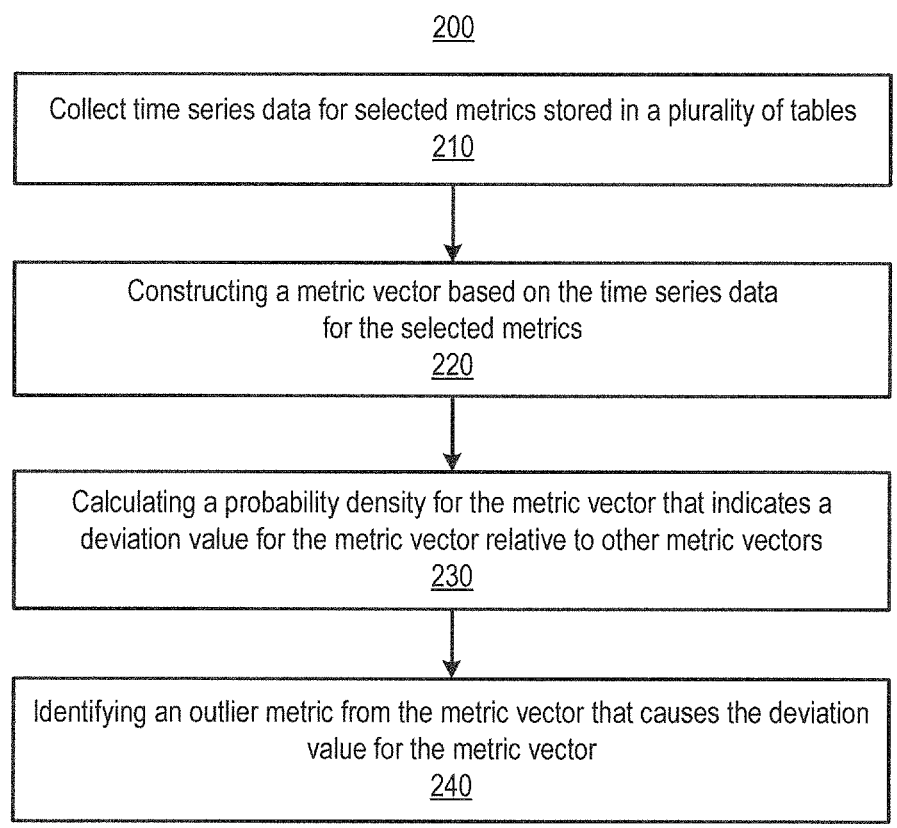
FIG. 2 shows a flow diagram of a method to Identify metrics that cause a deviation in data, according to an example of the present disclosure.
Figure 3:
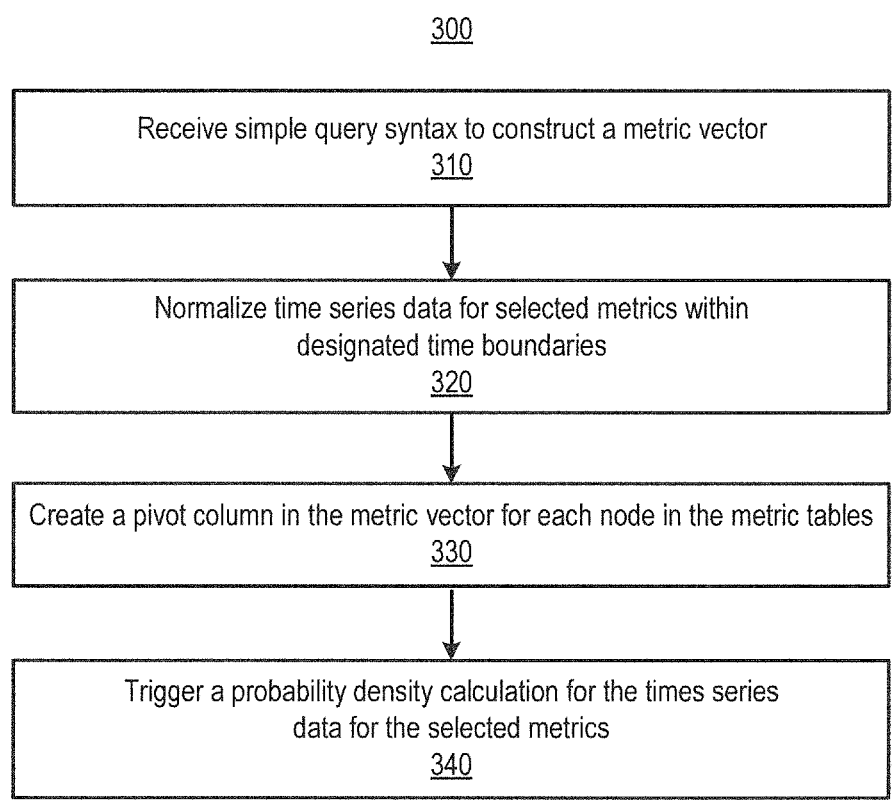
FIG. 3 shows a flow diagram of a method to construct a metric vector based on the data for the selected metrics, according to an example of the present disclosure.
Figure 4:
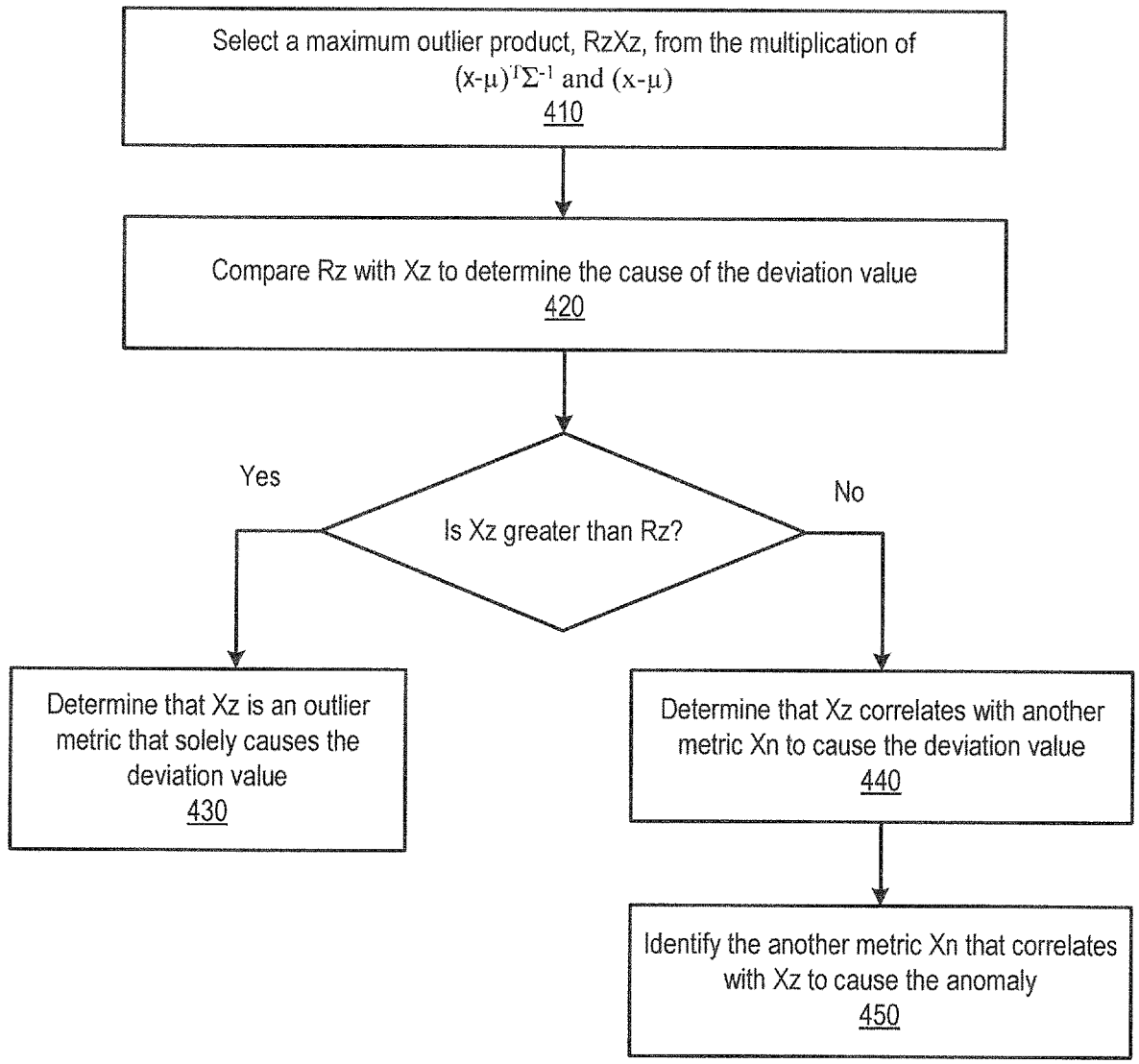
FIG. 4 shows a flow diagram of a method to identify an out her metric from the metric vector, according to an example of the present disclosure.

FIGS. 2, 3, and 4 respectively depict flow diagrams of methods 200, 300, and 400 for identifying metrics that cause a deviation in data according to examples of the present disclosure. It should be apparent to those of ordinary skill in the art that the methods 200, 300, and 400 represent generalized illustrations and that other operations may be added or existing operations may be removed, modified or rearranged without departing from the scopes of the methods 200, 300, and 400. Methods 300 and 400 are related to the method 200 in that methods 300 and 400 include operations in addition to those included in the method 200. Thus, methods 300 and 400 may be construed as including all of the features discussed with respect to the method 200.

With reference to FIG. 2, there is shown a flow diagram of the method 200 to identify metrics that cause a deviation in data, according to an example of the present disclosure. The method 200 may be implemented, for instance, by the processor 102 of machine 100 as depicted in FIG. 1.

In FIG. 2, the data input engine 112, for instance, may collect data, such as time series data, for selected metrics stored in a plurality of tables, as shown in block 210. The data may represent measured data values from various components of systems in an IT ecosystem. The stored data may be fetched from various components in the IT ecosystem (e.g., server components, network components, storage components, etc.). The collected data for system metrics may relate to memory, computer processing unit (CPU), and input/output (IO), and the like.

At block 220, the data collector engine 114, for instance, may construct a metric vector based on the data for the selected metrics. That is, the data collector engine 114 may select sample data that contains a fixed set of metrics. For example, the data collector engine 114 may construct a metric vector X as the combination of the percent of memory used $X_1$, the percent of CPU used $X_2$, and the IO utilization $X_3$ of a server. Thus, the metric vector X may include metrics $\{X_1, X_2, X_3\}$. In a further example, the data collector engine 114 may compute clusters of two servers. According to this example, a feature vector X may include metrics $\{X_1, X_2, X_3, X_4, X_5, X_6\}$, wherein $X_1 X_2$ is the percent of memory used in a respective first and second server, $X_3$, $X_4$ is the percent of CPU used in the respective first and second server, and $X_5$, $X_6$ is the IO utilization for the respective first and second server. The construction of the metric vector may be implemented with a simple query syntax by a non expert end-user. The construction of the metric vector is discussed in greater detail in method 300 below.

At block 230, the probability engine 118, for instance, may calculate a probability density for the metric vector that indicates a deviation value for the metric vector relative to other metric vectors. A machine learning algorithm may be implemented to calculate the probability density for the metric vector. The machine learning algorithm may include, but is not limited to, a Multivariate Gaussian Distribution algorithm, a Bayesian linear regression algorithm, and neural network algorithms. In an example, the probability engine 116 may implement a Multivariate Gaussian Distribution algorithm on the metric vector to calculate its probability density value.

The probability density p(x) may be calculated using the Multivariate Gaussian Distribution equation defined below:

$$p(x) = \frac{1}{(2\pi)^{\frac{n}{2}} |\Sigma|^{\frac{1}{2}}} \exp\left(-\frac{1}{2}(x-\mu)^T \Sigma^{-1} (x-\mu)\right), \text{ wherein}$$

$$\mu = \frac{1}{m} \sum_{i=1}^{m} x^{(i)} \text{ and}$$

$$\Sigma = \frac{1}{m} \sum_{i=1}^{m} (x^{(i)} - \mu)(x^{(i)} - \mu)^T.$$

As depicted in the formulas above, x is the metric vector, $\mu$ is a mean distribution vector, $\Sigma$ is a covariance matrix, m is number of samples, and n is the dimension of the feature vectors. An open source Java linear algebra library, such as Efficient Java Matrix Library, may be utilized by the probability engine 116 to perform the required matrix math.

According to an example, a very small probability density in relation to other metric vectors may indicate that the metric vector is an anomaly. For instance, the anomaly detection manager 110 may generate a report including a column for the calculated probability density. Once the anomaly detection manager 110 has monitored the probability density value over a period of time, the probability engine 118 may trigger an alert in response to the calculated probability density value reaching a predetermined threshold according to an example. The predetermined threshold may be selected by an end-user or automatically determined by the anomaly detection manager 110.

At block 240, the outlier engine 118, for instance, may identify an outlier metric from the metric vector that causes the deviation value for the metric vector. As discussed in block 230, the probability engine 116 may calculate a probability density for the metric vector and determine that the metric vector is an anomaly relative to other metric vectors. However, when many metrics are involved, guessing which metric caused the probability density value p(x) to tend to zero is nearly impossible. Thus, an outlier metric from the metric vector that causes the deviation value for the metric vector may be identified according to an example. The identification of the outlier metric is discussed in greater detail in method 400 below.

According to an example, the anomaly detection manager 110 may generate a report including a column for the calculated probability density value at block 230 and a column for the identified outlier metric value identified at block 240. From an end-user's standpoint, generating the report involves entering a simple query syntax into the IO interface 106 as discussed in greater detail in method 300 below. In this case, the two columns, the calculated probability density value and the identified outlier metric value, are automatically added according to an example. For visualization, a user may add visualization commands in a query so that both time-series graphing and zoom capability can be used in conjunction with these two new report columns. Thus, end-users of this report may sort on the calculated probability density values and analyze the smallest values. These smallest values may represent the anomalies. Additionally, using the outlier metric value along with the graph zooming capability, end-users may narrow down their investigation on specific outlier metrics.

With reference to FIG. 3, there is shown a flow diagram of the method 300 to construct a metric vector based on the data for the selected metrics, according to a further example of the present disclosure. The method 300 may be implemented, for instance, by the processor 102 of machine 100 as depicted in FIG. 1.

Memory, CPU and IO data, for instance, are typically stored in three different tables. Thus, end-users may try to construct a metric vector by combining these three tables using a SQL JOIN statement. However, in order to join the fables, a common column between each table is required to serve as a marker, which indicates that data with same values in the common columns are "joined" together. The common "join" column is naturally the data collection timestamp column, but since the collected time series data for the selected metrics are asynchronous and time drift among cluster nodes is common, the timestamps in each table do not contain common values to join on.

Additionally, storing similar time series data values for different nodes may typically be implemented by adding a column in a particular metric table to define the node on which the metric was collected. According to an example, the metric vector may dynamically generate a pivot for each different node. That is, the metric vector, for instance, may generate the node column into as many columns as there are distinct values in it. Standard SQL, however, does not support the dynamic creation of a pivot for each node. For example, transitioning from a table including a timestamp column, a CPU utilization column, and a server node column to a metric vector that will dynamically create one column for each server node for distinct CPU utilization data is not something that standard SQL supports.

According to an example, the method 300 may construct a metric vector by aligning the collected data for the selected metrics within designated time boundaries to provide a common column between each table to perform an in-memory join. Additionally, the method 300 may create as many columns as needed to accommodate the number of distinct nodes in the node column of a particular metric table.

At block 310, the vector generator engine 114, for instance, may receive a simple query syntax to construct the metric vector discussed above in block 220 of FIG. 2. The simple query syntax may be received at the vector generator engine 114 from an end-user via the IO interface 108. For example, a JavaScript Object Notation (JSON) derived simple query syntax is shown below.

```
TimeseriesMetricMatrix = {"smartJoinQueries":[
    {"sqlQuery":"select samplingTS, nodeName, memPct from
memTable", "series":"nodeName"},
    {"sqlQuery":"select samplingTS, nodeName, cpuPct from
cpuTable","series":"nodeName"},
    {"sqlQuery":"select samplingTS, nodeName, IO from
ioTable","series":"nodeName"}],
    "samplingRate":2,"multivariateGaussian":true};
```

An end-user may input this simple query syntax into the vector generator engine 114 to construct metric vectors out of data with non-synchronized sampling times that are stored in the metrics tables (e.g., memTable, cpuTable, and the ioTable). According to an example, the vector generator engine 114 may recognize this simple query syntax as needing a special in-memory join. The vector generator engine 114 may then perform each select statement from sqlQuery to sample the time series data according to an example.

At block 320, the vector generator engine 114 may normalize the data for the selected metrics within designated time boundaries. That is, for instance, the vector generator engine 114 may align the time series data within samplingRate time boundaries. In the simple query syntax above, the time series data is aligned within 1 minute samplingRate time boundaries. That is, because the base sampling rate is 30 seconds and "sampling Rate":2 denotes two times 30 seconds.

At block 330; the vector generator engine 114 may create a pivot column in the metric vector for each node in the metrics tables (e.g., memTable, cpuTable, and the ioTable). That is, for instance, because the time series data is aligned within designated time boundaries, the vector engine 114 may create as many columns as needed in the metric vector to accommodate the number of nodes found in the nodeName column of the metrics tables. According to an example, the vector generator engine 114 may dismiss any metric vector that contains null values.

At block 340, an end-user may trigger a probability density calculation by setting "multivariateGaussian" to true in the simple query syntax. Accordingly, the vector generator engine 114 may trigger the probability engine 116 to Implement Multivariate Gaussian Distribution on the data for the selected metrics as discussed at block 230 in FIG. 2.

With reference to FIG. 4, there is shown a flow diagram of the method 300 to identify an outlier metric from the metric vector, according to a further example of the present disclosure. The method 400 may be implemented, for instance, by the processor 102 of machine 100 as depicted in FIG. 1.

As discussed at block 230 in FIG. 2, a very small probability density of the metric vector relative to other metric vector may indicate an anomaly. However, when many metrics are involved, it may prove difficult for an end-user to figure out which metric causes the probability density of the metric vector to tend to zero. Accordingly, the method 400 of FIG. 4 provides an end-user with an indication of a likely outlier metric that caused the deviation value for the metric vector.

Referring to the Multivariate Gaussian Distribution equation above, the probability density p(x) tends to zero as $(x-\mu)^T\Sigma^{-1}(x-\mu)$ tends to a large positive number. This part of the Multivariate Gaussian Distribution equation translates info multiplying the metric vector x minus mean distribution values $\mu$ with a number coming from the $(x-\mu)^T\Sigma^{-1}$ computation. As an example, let $X=(x-\mu)=\{X_1, X_2, X_3 \ldots X_k\}$ and $R=(x-\mu)^T\Sigma^{-1}=\{R_1, R_2, R_3 \ldots R_k\}$, where k varies between 1-n, n being the number of metrics. In other words, each vector may have unlimited dimensions. Accordingly, the product of $(x-\mu)^T\Sigma^{-1}(x-\mu)=R_1X_1+R_2X_2+R_3X_3+ \ldots R_kX_k$.

At block 410, the outlier engine 118, for instance, may select a maximum outlier product from the multiplication of $(x-\mu)^T\Sigma^{-1}$ and $(x-\mu)$. That is, the outlier engine 118 may select a maximum product, for instance, $R_zX_z$, from $R_1X_1+R_2X_2+R_3X_3+ \ldots R_kX_k$ as the outlier product.

At block 420, the outlier engine 11B, for instance, may compare a first metric from the maximum outlier product that is equal to $(x-\mu)^T\Sigma^{-1}$ to a second metric from the maximum outlier product that is equal to $(x-\mu)$. In other words, the outlier engine 118 may compare the first metric $R_z$ with the second metric $X_z$ to determine whether the second metric $X_z$ is the sole cause of the deviation value or whether the second metric $X_z$ correlates with another metric $X_j$ to cause the deviation value.

At block 430, in response to the second metric being greater than the first metric, the second metric is determined to be the sole outlier metric that causes the deviation value. That is, for instance, if $X_z>R_z$, then the effect of $(x_z-\mu)_z$ is bigger than the effect of $((x-\mu)^T\Sigma^{-1})_z$ and the outlier engine 118 may determine that the outlier metric column $X_z$ solely impacts the deviation of the probability density p(x) because $X_z$ is very far from zero in regard to its expected variance.

At block 440, in response to the second metric being less than the first metric, the second metric is determined to correlate with the another metric to cause the deviation value. Thai is: for instance, if $X_z<R_z$, then the effect of $((x-\mu)^T\Sigma^{-1})_z$ is bigger than the effect of $(x_z-\mu_z)$. Therefore, the outlier engine 118 may determine that a correlation of $X_z$ with another metric $X_j$ causes the anomaly.

At block 450, the outlier engine 118 may identify the another metric Xj that correlates with the outlier metric to cause the anomaly. According to an example, the outlier engine 118 may compute a correlation matrix C based on $\Sigma$ using the formula $C_{i,j}=\Sigma_{i,j}/\sqrt{\Sigma_{i,i}\Sigma_{j,j}}$ to identify the another metric $X_j$ that likely correlates with the outlier metric $X_z$ to cause the anomaly. According to the formula, C is a symmetric matrix that contains numbers between −1 and 1, which represent the degree of correlation between the second metric i, and the another metric j. For example, 1 is the perfect correlation, −1 perfect inverse correlation, and 0 represents totally independent variables. The outlier engine 118 may then compute the maximum of $|C_{z,j}|$ and report the column index j along with a sign of $C_{z,j}$ that indicates a direct correlation or an inverse correlation.

Thus, the outlier engine 118 may identify three possible results when reporting an identified outlier metric according to an example. First, for instance, the outlier engine 118 may identify that a first column is deviating from its mean value significantly. Second, the outlier engine 118 may identify that the first column in direct correlation with a second column is deviating from its mean value significantly. Third, the outlier engine 118 may identify that the first column in inverse correlation with a second column is deviating from its mean value significantly.

According to the disclosed examples, an end-user may generate a report that includes anomaly detection using a simple query syntax that generates a metric vector and invokes a machine learning technique. In this case, two columns are automatically created. The two created columns represent the calculated probability density value of the metric vector and the identified likely outlier metric its possible correlations. For visualization, end-users may add commands in the query so that both time-series graphing and zoom capability may be used in conjunction with these two new columns. Accordingly, end-users of this report simply run the simple query syntax, sort on the calculated probability density value column and analyze the smallest values, which represent the anomalies. Using the hint from outlier metric column along with the graph zooming capability, end-users may narrow down their investigation on outlier metrics.

What has been described and illustrated herein are examples of the disclosure along with some variations. The teems, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method implemented in operation control information technology environment, to identify metrics that cause a deviation in data, comprising:

collecting, by a processor, the data for selected metrics stored in a plurality of tables, wherein the data includes operational data fetched from one or more system components comprising servers, network components or storage components;

constructing a metric vector based on the data for the selected metrics, wherein the selected metrics include a percent of memory used by a server, a percent of a computer processing unit (CPU) used by the server, or an input/output utilization of the server monitored over a period of time;

calculating a probability density for the metric vector that indicates a deviation value for the metric vector relative to other metric vectors, wherein the calculating of the probability density for the metric vector includes implementing a Multivariate Gaussian Distribution algorithm; and identifying an outlier metric from the metric vector that causes the deviation value for the metric vector, wherein the identifying of the outlier metric includes:

selecting a maximum outlier product from the multiplication of $(x-\mu)^T\Sigma^{-1}$ and $(x-\mu)$, where x is the metric vector, $\mu$ is a mean distribution vector, and $\Sigma$ is a covariance matrix, and determining the outlier metric based on the maximum outlier product; and detecting anomaly associated with the one or more system components based on the outlier metric.

2. The method of claim 1, wherein the determining of the outlier metric includes comparing a first metric from the maximum outlier product that is equal to $(x-\mu)^T\Sigma^{-1}$ to a second metric from the maximum outlier product that is equal to $(x-\mu)$.

3. The method of claim 2, wherein the second metric is identified as the outlier metric that solely causes the deviation value responsive to the second metric being greater than the first metric, and the second metric is identified as correlating with another metric to cause the deviation value responsive to the second metric being less than the first metric.

4. The method of claim 3, wherein identifying the another metric includes:
   calculating $C_{i,j}=\Sigma_{i,j}/\sqrt{\Sigma_{i,i}\Sigma_{j,j}}$ to determine the another metric, where C is a correlation matrix representing the degree of correlation between the second metric i and the another metric j;
   computing the maximum value of $|C_{i,j}|$; and
   reporting the another metric j and a direct or inverse correlation between the second metric i and the another metric j represented by a sign of $C_{i,j}$.

5. The method of claim 1, wherein the constructing of the metric vector includes:
   normalizing the data for the selected metrics within designated time boundaries; and
   creating a pivot for each node of the selected metrics,
   wherein the normalizing of the data for the selected metrics and the creating of the pivot for each node of the selected metrics are implemented by an in-memory join syntax.

6. The method of claim 1, including triggering an alert responsive to the calculated probability density value reaching a predetermined threshold.

7. The method of claim 1, including generating a report, wherein the report includes a column for the calculated probability density and a column for the identified outlier metric.

8. A system for operation control information technology environment, to identify metrics that cause a deviation in data, comprising:
   a processor and a memory;
   a data collector engine stored in a memory, executed by the processor, to collect the data for selected metrics stored in a plurality of tables, wherein the data includes operational data fetched from one or more system components comprising servers, network components or storage components;
   a vector generating engine, stored in the memory, to construct a metric vector based on the data for the selected metrics, wherein the selected metrics include a percent of memory used by a server, a percent of a computer processing unit (CPU) used by the server, or an input/output utilization of the server monitored over a period of time;
   a probability engine, stored in the memory, to calculate a probability density for the metric vector using a Multivariate Gaussian Distribution algorithm, wherein the probability density indicates a deviation value for the metric vector relative to other metric vectors; and
   an outlier engine, stored in the memory, to identify an outlier metric from the metric vector that causes the deviation value for the metric vector, wherein the identifying of the outlier metric includes:
      selecting a maximum outlier product from the multiplication of $(x-\mu)^T\Sigma^{-1}$ and $(x-\mu)$, where x is the metric vector, $\mu$ is a mean distribution vector, and $\Sigma$ is a covariance matrix, and
      determining the outlier metric based on the maximum outlier product; and detecting anomaly associated with the one or more system components based on the outlier metric.

9. The system of claim 8, wherein to determine the outlier metric the outlier engine is to:
   compare a first metric from the maximum outlier product that is equal to $(x-\mu)^T\Sigma^{-1}$ to a second metric from the maximum outlier product that is equal to $(x-\mu)$;
   in response to the second metric being greater than the first metric, identify the second as the outlier metric that solely causes the deviation value; and
   in response to the second metric being less than the first metric, identify the second metric as correlating with another metric to cause the deviation value.

10. The system of claim 9, wherein to identify the another metric, the outlier engine is to:
    calculate $C_{i,j}=\Sigma_{i,j}/\sqrt{\Sigma_{i,i}\Sigma_{j,j}}$ to determine the another metric, where C is a correlation matrix representing the degree of correlation between the second metric i and the another metric j;
    compute the maximum value of $|C_{i,j}|$; and
    report the another metric j and a direct or inverse correlation between the second metric i and the another metric j represented by a sign of $C_{i,j}$.

11. The system of claim 8, wherein to construct a metric vector, the vector generating engine is to:
    normalize the data for the selected metrics within designated time boundaries; and
    create a pivot for each node of the selected metrics,
    wherein the normalizing of the data for the selected metrics and the creating of the pivot for each node of the selected metrics are implemented by an in-memory join syntax.

12. A non-transitory computer readable medium including machine readable instructions executable by a processor in operation control information technology environment, to:
    collect data for selected metrics stored in a plurality of tables, wherein the data includes operational data fetched from one or more system components comprising servers, network components or storage components;
    construct a metric vector based on the data for the selected metrics, wherein the selected metrics include a percent of memory used by a server, a percent of a computer processing unit (CPU) used by the server, or an input/output utilization of the server monitored over a period of time;
    calculate a probability density for the metric vector using a Multivariate Gaussian Distribution algorithm, wherein the probability density indicates a deviation value for the metric vector relative to other metric vectors; and
    identify an outlier metric from the metric vector that causes the deviation value for the metric vector, wherein the identifying of the outlier metric includes:
       selecting a maximum outlier product from the multiplication of $(x-\mu)^T\Sigma^{-1}$ and $(x-\mu)$, where x is the metric vector, $\mu$ is a mean distribution vector, and $\Sigma$ is a covariance matrix, and
       determining the outlier metric based on the maximum outlier product; and detecting anomaly associated with the one or more system components based on the outlier metric.

* * * * *